United States Patent

Malaval

[15] 3,684,301

[45] Aug. 15, 1972

[54] ROTATING SHAFT SEAL ASSEMBLY

[72] Inventor: Claude Rene Jean Malaval, 39, rue des Coquelicots, 92 Anthony, France

[22] Filed: Dec. 22, 1970

[21] Appl. No.: 100,731

[30] Foreign Application Priority Data

Dec. 22, 1969 France..................6944468

[52] U.S. Cl..................................277/59
[51] Int. Cl..................................F17j 15/40
[58] Field of Search.....................277/58, 59

[56] References Cited

UNITED STATES PATENTS 3,075,780  1/1963  Mayer..................277/59

3,599,993  8/1971  Eriksson..................277/59

FOREIGN PATENTS OR APPLICATIONS 913,375  6/1954  Germany..................277/59
943,107  9/1948  France....................277/59

Primary Examiner—Robert I. Smith
Attorney—Sughrue, Rothwell, Mion, Zinn & Macpeak

[57] ABSTRACT

A watertight seal for a shaft turning through a wall separating two fluids under very different pressures or at very different viscosity comprises a part fixed to the wall and a part sliding in the latter. In each of the parts, an O ring joint has a pressure ring surrounding the shaft. Between both parts, there is a cavity containing a fluid of very high viscosity and splines provided on both parts guide the sliding movement and prevent the rotation of the mobile part.

6 Claims, 2 Drawing Figures

3,684,301

ROTATING SHAFT SEAL ASSEMBLY

BACKGROUND OF THE INVENTION

1. Field of the Invention

The present invention concerns a device for passing a rotatable shaft in fluid-tight fashion through an enclosure wall, and is particularly applicable, although not exclusively, to passing a shaft through a wall which separates fluids at different pressures and/or different viscosities.

2. Description of the Prior Art

Many devices for passing rotatable shafts in fluid-tight fashion through walls have already been proposed. These proposals are generally effective where the pressure differential or difference in viscosity on opposite sides of the wall is relatively low. However, in the case of high pressure or viscosity differentials, the previously proposed arrangements are often unable to provide an effective seal. The difficulty in obtaining an efficient seal is further aggravated by mechanical imperfections of the shaft, particularly any departures from perfect circularity.

SUMMARY OF THE INVENTION

In accordance with the present invention, a device for passing a rotatable shaft in fluid-tight fashion through an enclosure wall includes a housing for attachment to the enclosure wall and carries spaced first and second bearings for locating respective portions of the shaft. A first toroidal seal seals the housing to a shaft portion intermediate the bearings. The seal comprises a sleeve arranged to encircle the shaft and having respective annular flanges at its opposite ends between which is located an O-ring. An annular body is arranged to encircle the shaft between the first toroidal seal and the first bearing and is freely slidable along the shaft. The housing and the annular body define, between them, a space for receiving a viscous fluid. A second toroidal seal, substantially identical to the first, seals the annular body to the shaft and arrangement prevents relative rotation of the annular body and the housing.

BRIEF DESCRIPTION OF THE DRAWINGS

The invention will now be described in more detail, by way of examples only, with reference to the accompanying partly diagrammatic drawings in which.

DESCRIPTION OF THE PREFERRED EMBODIMENTS

Figure 1:
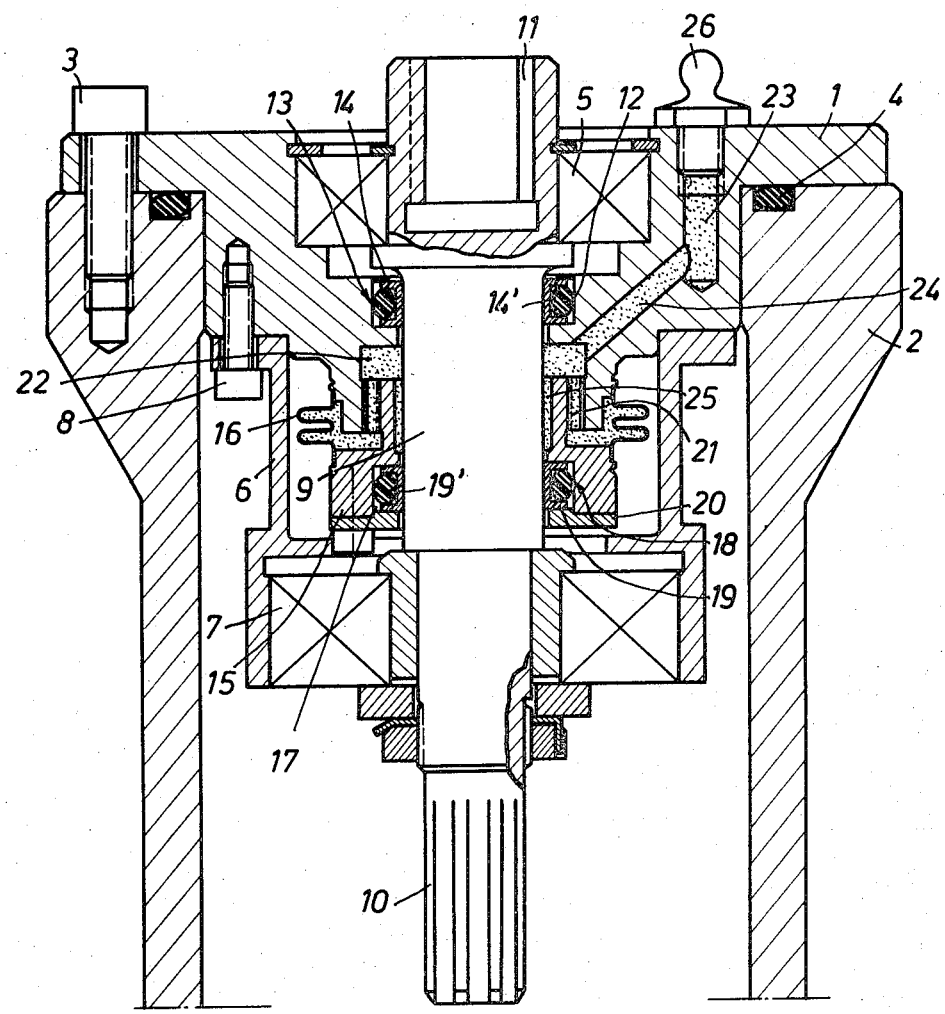
Fig. 1 is an axial section of a first form of device for passing a rotatable shaft in fluid-tight fashion through an enclosure wall.

Referring to FIG. 1, the device includes a cover plate 1 attached to a cylindrical portion 2 of an enclosure wall by means of screws of which one is shown at 3. The enclosure contains a fluid under pressure, and the plate 1 is sealed to the enclosure wall portion 2 by a conventional O-ring 4.

A first bearing 5 is carried by the plate 1. A sleeve 6 is attached to a lower face of the plate 1, and carries a second bearing 7 spaced from the first bearing 5. The bearings 5 and 7 are for locating respective portions of the shaft. The sleeve 6 is attached to the plate 1 by screws of which one is shown at 8.

The shaft 9 passes through the bearings 5 and 7, and has at its lower end, inside the enclosure, a splined coupling 10. At its other end, outside the enclosure, the shaft 9 has a coupling socket 11.

Intermediate the bearings 5 and 7, an annular recess 12 in the plate 1 receives a first toroidal seal comprising a ring 14 of U-shaped cross section retaining an O-ring 14'. The ring 14 consists of a sleeve encircling the shaft 9 and having respective annular flanges at its opposite ends between which the O-ring 14' locates. The ring 14 is constructed of a self-lubricating material such as that available under the registered trade mark Teflon. The O-ring 14' is of an elastomer material. The sleeve portion of the ring 14 contacts the shaft 9, and is sealed to the plate 1 by the O-ring 14'.

An annular body 15 encircles the shaft 9 between the first toroidal seal 13 and the bearing 7. It is connected to the plate 1 by an elastically expansible and compressible metal bellows 16. An annular recess 17 in the annular body receives a second toroidal seal 18, identical to the seal 13, and comprising a ring 19 of U-shaped cross-section retaining an O-ring 19'. The recess 17 being formed at a lower end of the body 15, the joint 18 is retained within the recess by a flange 20 attached to a lower end face of the body 15.

Relative rotation of the body 15 within the housing formed by the plate 1 and sleeve 6 is prevented by a set of cooperating splines 21 carried by the body and the housing and extending parallel to the shaft 9 so that the annular body 15 is freely slidable along the shaft.

Between the plate 1 and the annular body 15 there is defined a space 22 communicating with a reservoir 23 for a viscous fluid such as an oil or grease, for example. A conduit 24 extends between the space 22 and the reservoir 23. The space 22 also communicates with the interior of the bellows 16, via the sets of splines 21, and with the annular recess 17. An annular passage 25 provides the communication between the space 22 and the recess 17. The reservoir 23 is sealed by a plug 26.

The pressure within the enclosure urges the annular body 15 upwardly, so compressing the bellows 16. The body 15 moves to a position at which the pressure of the fluid inside the space 22 is equal to that inside the enclosure. The pressure difference across the seal 18 is thus very small, so that fluid is unable to escape from the enclosure past this seal.

Although the seal 13 is subject on one side to the pressure of the fluid in the space 22, the viscosity of this fluid is such that very little leakage takes place. In any case, the leakage of small quantities of the grease or oil from space 22 is not particularly inconvenient.

The cooperating splines 21, in preventing rotation of the annular body 15, ensure that the bellows 16 is not subject to any torsion.

Figure 2:
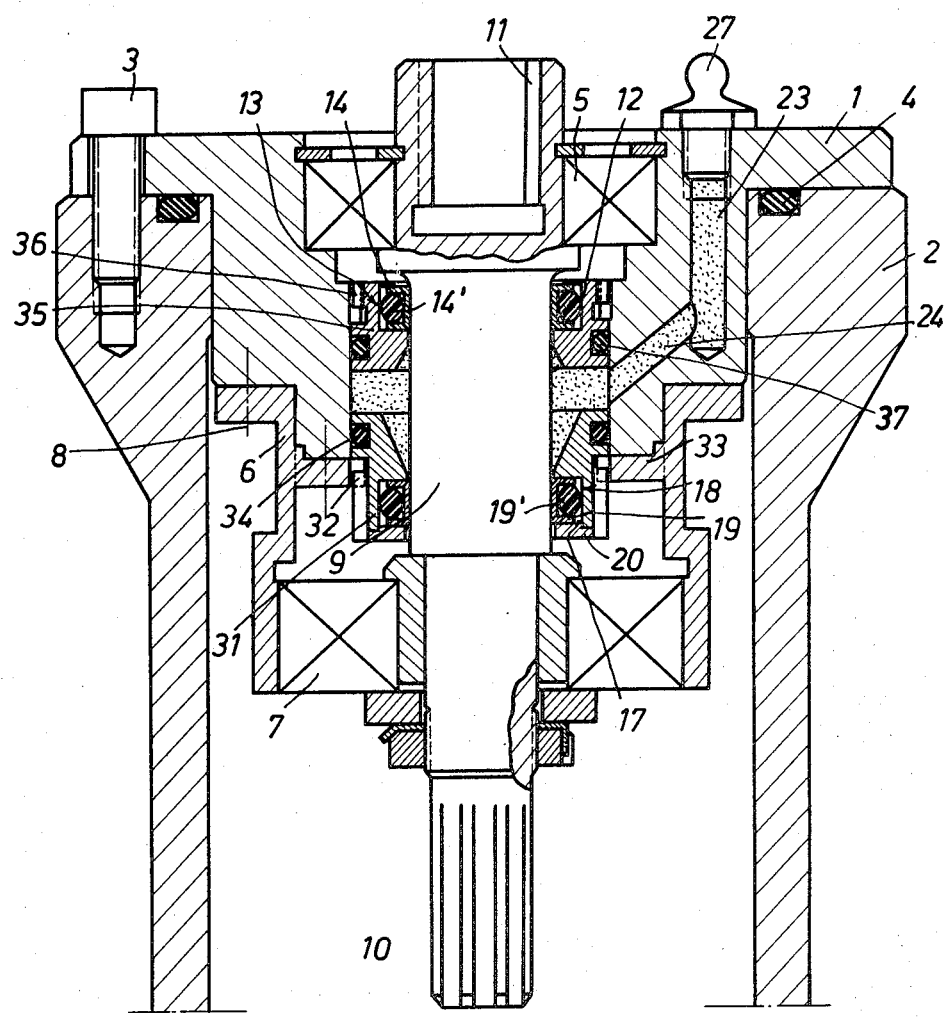
FIG. 2 is a similar section of a second form of device.

Referring to FIG. 2, a second form of device is generally similar to the first form just described with reference to FIG. 1. In the two figures, elements of the device which are identical or which serve an analogous function carry the same reference numerals. These parts will not be described again.

In the second form of the device, an annular body 31, analogous to the body 15 of FIG. 1, is slidable along the shaft 9 within a cylindrical passage in the plate 1. The body 31 has an annular recess 17 which a toroidal seal 18 is retained by a flange 20.

The body 31 and an internal flange 33 of the sleeve 6 carry cooperating splines 32 preventing rotation of the body 31 inside the housing formed by the plate 1 and the sleeve 6. Sealing between the body 31 and the cylindrical passage in the plate 1 is obtained by means of an O-ring 34.

The first toroidal seal 13 is no longer carried by the plate 1, but rather by a ring 35 encircling the shaft and also slidable along the shaft inside the cylindrical passage formed in the plate 1. Splines 36 prevent rotation of the ring 35 relative to the plate 1. The ring 35 is sealed to the cylindrical passage by an O-ring 37.

The pressure inside the housing urges the annular body 31 upwardly until the pressure of the viscous fluid retained in the annular passage in plate 1 and between the body 31 and ring 35 is equal to that of the fluid in the enclosure. Thus, sealing is obtained in precisely analogous manner to that of FIG. 1, but the device of FIG. 2 provides a better seal, so being suitable for higher pressure differentials.

The devices just described have certain advantages. The provision of a viscous fluid between the fixed and movable parts of the device has the effect of eliminating leakage of the fluid under pressure, only leakage of this viscous fluid being possible and not presenting serious inconvenience.

The efficacy of the seal obtained is no longer influenced by the slight mechanical variations of the shaft, which are automatically compensated for by the viscous fluid and the movable part of the device. The devices have simple structures so that assembly and dismantling are easy and rapid. It is thus easy to gain access to and replace the various seals of the device when these become worn or damaged.

What is claimed is:

1. A device for mounting a rotatable shaft in fluid-tight fashion to an enclosure wall through which it passes, comprising:

a housing attached to the enclosure wall and carrying spaced first and second bearings for locating respective portions of the shaft, a first toroidal seal for sealing the housing to a portion of said shaft intermediate the bearings, said seal comprising a sleeve arranged to encircle the shaft and having respective annular flanges at its opposite ends between which is located an O-ring, an annular body arranged to encircle the shaft between the first toroidal seal and the first bearing and being freely slidable along the shaft, the housing and the annular body defining between them a space receiving a viscous fluid, a second toroidal seal substantially identical to the first for sealing the annular body to the shaft, and means for preventing relative rotation of the annular body and the housing.

2. The device as claimed in claim 1, wherein the housing and the annular body are coupled by an elastically expansible and compressible bellows.

3. The device as claimed in claim 2, wherein the means for preventing relative rotation of the annular body and the housing comprises cooperating sets of splines on the body and the housing extending parallel to the shaft axis, whereby the body is free to slide along the shaft.

4. The device as claimed in claim 1, wherein said housing defines a cylindrical passage, wherein the annular body is slidable within and sealed to the walls of said cylindrical passage and defines, with the annular body, the space for receiving the viscous fluid.

5. The device as claimed in claim 4, wherein the means for preventing relative rotation of the annular body and the housing comprises cooperating sets of splines of the body and the housing extending parallel to the shaft axis, whereby the body is free to slide along the shaft.

6. The device as claimed in claim 1, wherein the means for preventing relative rotation of the annular body and the housing comprises cooperating sets of splines on the body and the housing extending parallel to the shaft axis, whereby the body is free to slide along the shaft.

* * * * *